United States Patent [19]

Arion

[11] 4,002,455
[45] Jan. 11, 1977

[54] PROCESS FOR TREATING AND RECOVERING WASTE WATER FROM THE FERTILIZER MANUFACTURE

[75] Inventor: Nicolae Mihai Arion, Bucharest, Romania

[73] Assignee: Institutul de Proiectari Pentru Industria Chimica Anorganica si a Ingrasamintelor, Bucharest, Romania

[22] Filed: July 23, 1975

[21] Appl. No.: 598,361

Related U.S. Application Data

[63] Continuation of Ser. No. 474,020, May 28, 1974, abandoned, which is a continuation-in-part of Ser. No. 313,091, Dec. 7, 1972, abandoned, which is a continuation of Ser. No. 80,019, Oct. 12, 1970, abandoned.

[52] U.S. Cl. .......................................... 71/1; 71/34; 210/33; 210/37 R
[51] Int. Cl.² ........................................... B01D 15/06
[58] Field of Search ............... 71/1, 34, 59; 210/24, 210/25, 30, 32, 37, 38, 37 A; 260/2.1 R, 2.1 M, 2.2 R; 423/396

[56] References Cited

UNITED STATES PATENTS

| | | | |
|---|---|---|---|
| 3,144,321 | 8/1964 | Butikofer | 71/59 |
| 3,199,950 | 8/1965 | Austin | 71/59 X |
| 3,475,330 | 10/1969 | Gilles | 210/30 X |
| 3,492,092 | 1/1970 | Higgins | 71/34 X |
| 3,579,322 | 5/1971 | Higgins | 71/34 |
| 3,660,283 | 5/1972 | Ryan | 210/38 X |
| 3,775,088 | 11/1973 | Higgins | 423/396 X |

OTHER PUBLICATIONS

Continuous Ion-Exchange of Process Water, Chemical Eng. Progress, June 1969, No. 6, pp. 59 and 60, Higgins.
Synthetic Ion-Exchanges, G. H. Osborn, 1961, Chapman and Hill, Ltd., p. 5.

*Primary Examiner*—Charles N. Hart
*Assistant Examiner*—Robert H. Spitzer
*Attorney, Agent, or Firm*—Karl F. Ross; Herbert Dubno

[57] ABSTRACT

Waste water from the manufacture of fertilizers with nitrogen and others is treated on ion-exchange resins. The resulting demineralized water is used as such. The ion-exchange resins are regenerated with highly concentrated nitric acid, in excess, with highly concentrated ammonia solution, respectively. The resulting mixed effluent, with the eluated salts and with the acid excess is recycled to the manufacture of the fertilizer, at an adequate stage, wherein they are recovered.

4 Claims, 3 Drawing Figures

PROCESS FOR TREATING AND RECOVERING WASTE WATER FROM THE FERTILIZER MANUFACTURE

CROSS REFERENCE TO RELATED APPLICATIONS

This is a continuation of application Ser. No. 474,020, filed 28 May 1974, now abandoned; which is a continuation-in-part of Application Ser. No. 313,091 filed 7 Dec. 1972, now abandoned, as a continuation of application Ser. No. 80,019 filed 12 Oct. 1970 and now abandoned.

FIELD OF THE INVENTION

The present invention relates to a process for treating and recovering the waste water from the manufacture of fertilizers with nitrogen and others, by using cationic and anionic ion-exchange resins and concentrated acids and bases.

BACKGROUND OF THE INVENTION

The factories of fertilizers with nitrogen and others discharge large quantities of much diluted waste water, with cation and anion contents. Thus, in the manufacture of ammonium nitrate, there is discharged waste water containing ammonia and ammonium nitrate; in the manufacture of complex fertilizers with N, P, K, the waste water contains ammonia, ammonium nitrate and triammonium phosphate, some calcium nitrate, and others.

The fast development of the industry of fertilizers with nitrogen, and others, called for the finding of an advantageous technical and economic method for the purification of this waste water, which strongly pollutes the river and lake waters into which it is discharged, giving rise to heavy damages to the piscicultural fauna, to the flora and to the human organisms they get in touch with.

Among the known technological processes for purification and rendering available, viz: biological purification, concentration of waste water, in plants for evaporation in states, the electro-dialysis in cells with selective ion exchange membranes, ammonia stripping by steam or air, demineralization by means of ion exchangers is discontinuous fixed bed or in continuous moving bed, it is appreciated that the process of ion exchange in moving (continuous) bed presents the most advantageous solution.

OBJECTS OF THE INVENTION

By performing the purification and recovery of this waste water, by using ion-exchange resins, the present invention meets two objectives: (a) it obtains, by the regeneration of ion exchangers exhausted by the ions from the waste water, an effluent with a particularly high content in the respective cations and anions; (b) the economic recovering of the solutions concentrated with cations and anions, resulting from the regeneration of ion exchangers, according to point (a).

SUMMARY OF THE INVENTION

For meeting the first object (point a), the present invention applies in this case the regeneration process of cationic and anionic exchanging resins, from my parent application and my further application Ser. No. 474,022, filed May 22, 1974, entitled "Process for the regeneration of ion-exchange resins and applications thereof".

In this continuation-in-part application, it is shown that the regeneration of ion-exchange resins can be performed with "highly" concentrated acids, bases respectively (that is, more concentrated that the "concentrated ones" known up till now), provided the operation takes place under the following conditions: at the interface liquid (regenerating agent, rinsing water) / resin bead, the resin temperature does not exceed a maximum of about 20° C, by removing the heat released by the strongly exothermal reactions of dilution of the concentrated regenerant with the water from the interstices between the resin bends, of neutralization of the regenerant ions retained by the exhausted resin, of dilution of the regenerating agent left in the interstices with the rinsing water, or inversely; the specified temperature, of maximum about 20° C, is maintained by the adequate selection of the temperature (from 0° to 15° C), of the volume (from 10 to 30 times the resin volume), and of the circulation speed of the regenerant (from 10 to 50 m/h), as well as of the thickness of the resin layer (maximum about 600 mm) through which the regenerant passes; prior to contacting the regenerant with the resin, the water from the resin interstices is removed, and inversely, i.e. the regenerant is removed from the resin interstices, prior to its rinsing with water; there are used cationic styrene-divinyl-benzene resins, macroporous, with high cross-linking degree, with about 12 to 20% divinyl-benzene; when these resins are sulphonated, this operation was to be carried out at the temperature of maximum 100° C; there are used anionic, middle basic resins; convenient anionic resins are the polyacrylic resins, macroporous.

In respect of the above established and described conditions, the ion exchange regeneration takes place in a different location (apparatus) from that used for exhaustion of the resins.

For such a regeneration, the ion exchange resin is introduced, into a static filtering apparatus, wherein the ionic resin is contained in a filtering space; in this space the resin is loaded and unloaded hydraulically.

In an embodiment example of the exhaustion-regeneration process, the regenerated resin is stored in an upper tank, from which it is transferred to an exhaustion reactor; thence, it is passed to the static regeneration apparatus, as described above; from here, the regenerated resin is recycled to the upper tank; all conveyances of the ion exchange resin are effected hydraulically.

In the regeneration of the cationic ion exchange resin, it is used from 45 to 60% concentrated nitric acid, in a great excess. The concentration of the nitric acid used in regeneration, corresponds to that of the nitric acid used in the manufacturing process, wherein the mixture effluent is recovered, as referred to hereafter.

The concentrated ammonia solution can contain 20-25% $NH_3$ and is used in excess. The concentration of this solution may however be reduced up to 10%, without disturbing the objective and economic exploitability of the invention.

The excess amounts of nitric acid and ammonia solution, used in the process, allow the use of the ion exchange resin at the useful capacity, near the total one, which increases the resin productivity.

As it was shown, the ion exchange resin type used at the conditions of the regenerating process, according to the invention, with strongly concentrated nitric acid, of 45 to 60%, keeps the resulting mixture effluent free from the presence of organic matter, generated by the mechanical degradation of the resin itself. It is known that in the manufacture of fertilizers with nitrogen a.o. (ammonium nitrate, complex fertilizers with N, P, K), very low contents only of organic matter (about 5 to 10 ppm) are admitted.

The second object of the invention, namely the recovery of the solutions concentrated in cations and anions, resulting from the regeneration with concentrated acids and bases, resides in directly recycling the effluent to the manufacturing process of fertilizers with nitrogen and others, at a suitable stage thereof. This direct recovery has become possible due to the high nitric acid concentrations contained in the effluent, which are even those of the manufacturing process into which it is introduced.

Another effect of processing the waste water from the manufacture of fertilizers with nitrogen and others, is also that of obtaining out of it demineralized water of high purity (electric conductivity of 0.3 to 0.5 $\mu$S/cm). This water may be used in feeding steam boilers or for other technological purposes.

BRIEF DESCRIPTION OF THE DRAWING

The above and other objects, features and advantages of the present invention will become more readily apparent from the following description, reference being made to the accompanying drawing in which.

SPECIFIC DESCRIPTION

Example 1.

Figure 1:
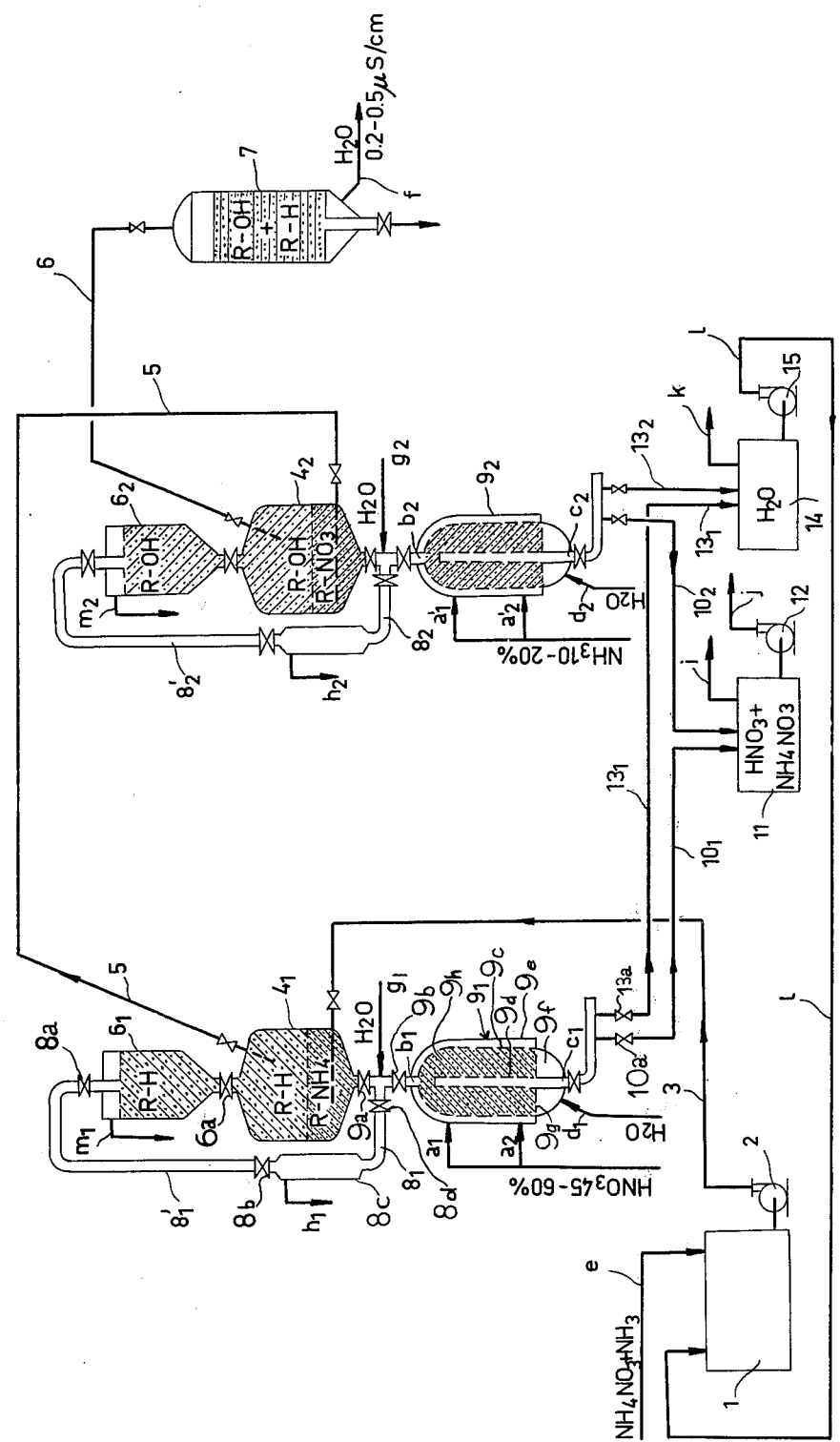
FIG. 1 is a flow diagram of a system for the treatment of waste water containing cations and anions, according to the present invention.

A fixing plant on cationic R-H and anionic R-OH ion-exchange resins, with continuous fixing reactors in moving bed and with static filter-type regenerating apparatuses, with a single, cylindrical, co-axial filtering layer, wherein the regeneration is effected with strongly concentrated nitric acid and concentrated ammonia solution, is shown in FIG. 1. There is used therein waste water with ammonium nitrate and ammonia, emanating from the ammonium nitrate manufacture.

As cationic resin is used a resin marketed under the trade name DUOLITE C264, or AMBERLITE C200, or ZEROLITE 625, which are strongly acid resins, macroporous, of styrene-divinyl-benzene type; as anionic resin is used the macroporous polyacrylic resin marketed under the trade name DUOLITE A366, which is middle basic. ammonia resin regeneration is carried out by maintaining the resin temperature at the interface liquid / resin bead at maximum about 20° C; through the resin previously cooled down to about 18° C is passed the regenerant cooled down to 12°–15° C, with the circulating speed of 15–18 m/h, in a volume of 12 vol/vol.resin, with the thickness of the layer of maximum 600 mm; under previous removal of the water and of the regenerant from the resin interstices by blowing-in of nitrogen.

The plant comprises: the reactors for cationic and anionic fixing, $4_1$ and $4_2$, respectively, disposed vertically between the feeding tanks for cationic and anionic resins, $6_1$ and $6_2$, respectively, and the regenerating apparatuses, $9_1$ and $9_2$, using nitric acid of 56–60%, and ammonia solution of 20–22%, respectively.

The residual waters with $NH_4^+$ and $NO_3^-$ ions, collected into tank 1, through pipe e, are sent by pump 2, through a pipe 3, into the cationic fixing reactor $4_1$; in this latter's lower R-H resin layer, the ammonium ions are integrally retained, in the form of $R-HN_4$. The resulting acid water, removed at the upper part, is conveyed, through a pipe 5, to the anionic fixing reactor $4_2$; it passes here, in upward direction, through the R-OH layer, which integrally retains the $NO_3^-$ ions, in the form of $R-NO_3$. The demineralized effluent leaves the reactor at the upper part, through a pipe 6, and is finished in the mixed-bed filter 7, filled with mixed cationic and anionic resin, that retain possible ionic leakages. The totally demineralized water, of high purity (0.3 to 0.5 $\mu$S/cm conductivity) is led, for use, through a pipe f.

The exhausted resins, from the lower zone of fixing reactors $4_1$ and $4_2$ are discharged, by portions, at their lower part, into pipes $8_1$, $8_1'$ and $8_2$, $8_2'$, respectively, where they are loosened by introducing water in upward direction, through pipes $g_1$, $g_2$. The water is eliminates through pipes $h_1$, $h_2$. The loosened resins and with separated chippings are hydraulically transferred to the regenerating apparatuses $9_1$, $9_2$.

In these apparatuses, the resins are compacted in the cylindrical, axial filtering layer; the conveying liquid, discharged through the central tube is eliminated through socket c; the water from the resin interstices is sucked through socket c; the regenerating agent, introduced into the shell of the apparatuses, through sockets $a_1$, $a_2$, traverses the resin layer, from the exterior to the interior, being discharged through a central tube and socket c. After resin regeneration, the regenerant from its interstices is expelled by blowing in air of inert gas (nitrogen), through socket d; the remaining of regenerating agent is rinsed with demineralized water, introduced through sockets $a_1$, $a_2$ and discharged through the central filtering tube and socket c.

The regeneration effluents discharged through pipes $10_1$, $10_2$ are collected in a vessel 11, under vacuum suction, through pipe i, whence they are conveyed by pump 12, for further use, through pipe j. The conveying water, the one from the voids and spaces and the rinsing water, flowing through pipes $13_1$, $13_2$, are collected into vessel 14, by vacuum suction, through pipe k, whence they are sent by pump 15, to tank 1, through pipe l.

The removal of the regenerated and rinsed resins, from reactors $9_1$, $9_2$ is performed hydraulically, by introducing water through sockets $d_1$, $d_2$, respectively; the resins pass through pipes $8_1,8_1'$, $8_2,8_2'$, respectively, into the feeding tanks $6_1$, $6_2$; the carrier water is eliminated through overflows $m_1$, $m_2$ of the tanks $6_1$, $6_2$.

Example 2.

Figure 2:
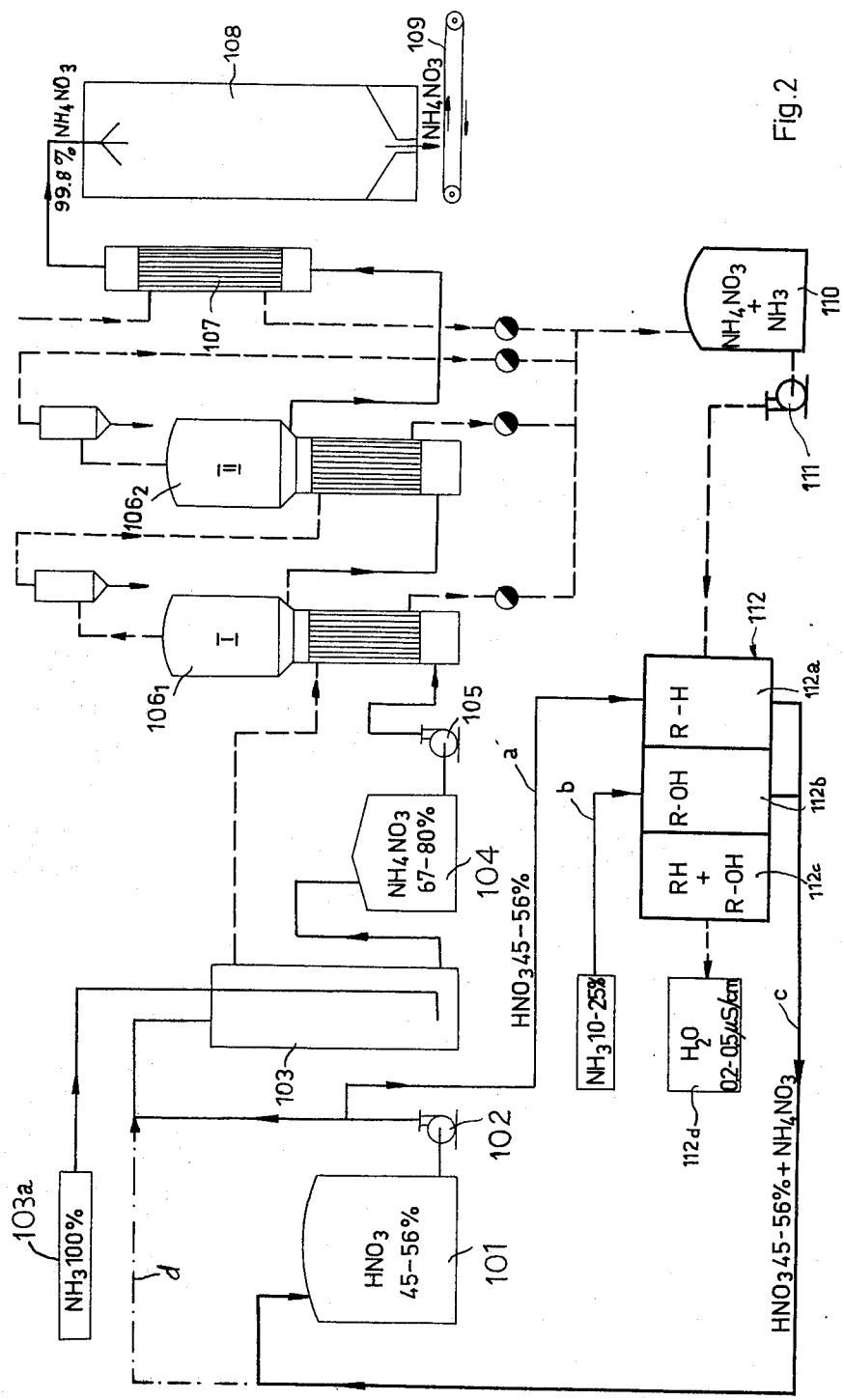
FIG. 2 is a flow diagram of a system of this general type as particularly applicable to the treatment and recovery of waste water from the manufacture of ammonium nitrate.

Application in the treatment and recovery of waste water with $NH_4NO_3$ and $NH_3$, from and in the ammonium nitrate manufacture, according to the flow sheet in FIG. 2.

In the ammonium nitrate manufacture, the nitric acid in the concentration of 45 to 60% (depending on the technological process adopted), stored in tank 1, is pumped by pump 2 into reactor 3, where it is neutralized with gaseous ammonia. The resulting ammonium nitrate solutions, of 67 to 80%, are collected in tank 4, whence they are sent by pump 5 for vacuum concentration, into evaporators $6_1, 6_2$, where they concentrate up to 94%. In the final concentrator 7, they are concentrated up to 99.8%, whereupon the resulting ammonium nitrate is granulated in tower 8, taken over by a conveyor belt 9 and packaged.

The water vapours released during neutralization and evaporation, in both the reactor 3 and evaporators $6_1, 6_2$ carry away the drops from the respective solutions; thus, the resulting condensates, collected in tank 10, contain (depending on the technological process applied) about 1 to 10 g/l $NH_4NO_3$ and 0.5 to 5 g/l $NH_3$.

According to the invention, these condensates (waste water) are continuously fed, by pump 11, in facility 12, similar for instance to that described in example 1. The ion-exchange resin regeneration is performed with 56–60% nitric acid, fed through pipe a, and with ammonia solution of 18–22%, fed through pipe b, into the respective regeneration apparatuses. There are used in the process: the resin DUOLITE C264 as cationic resin, and DUOLITE A366 as anionic resin, according to example 1, and the regeneration is carried out in the plant and at the parameters shown in said example. The resulting mixed effluent containing ammonium nitrate, in a great excess of 56–60% nitric acid, is conveyed to the ammonium nitrate manufacture, through pipe c, into tank 1, in view of its valorization. The resulting dimineralized water is used for the feeding of steam boilers and/or in the nitric acid manufacture.

The two mentioned resins may be utilized each in over 20,000 operating cycles.

The water purification and the components recovery from residual waters is thus integrally performed, at minimal expenses.

Example 3

Figure 3:
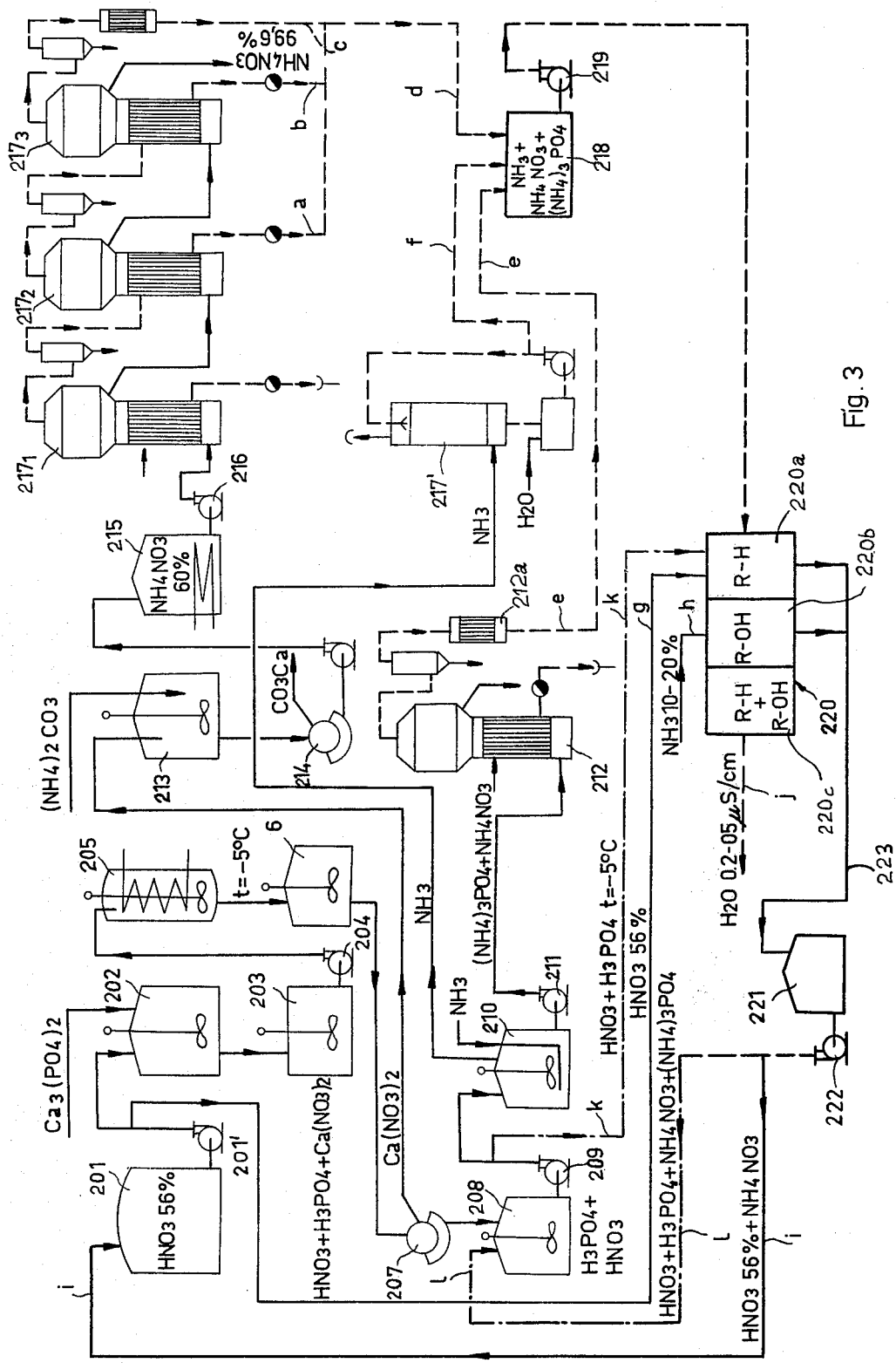
FIG. 3 is a flow diagram of the system of this general type as particularly applicable to the treatment and recovery of waste water from the manufacture of complex fertilizers containing nitrogen, phosphorus and potassium.

Application in the purification and recovery of residual waters with $NH_4NO_3$, $NH_3$, $(NH_4)_3PO_4$, some $(NO_3)_2Ca$, etc., from and in the manufacture of complex fertilizers with N, P, K, according to the Norsk-Hydro process, in conformity to the flow sheet in FIG. 3.

In this manufacture, the phosphorites are attacked, under stirring, with 60% nitric acid, taken over from tank 1, by pump 1,', into reactor 2. The resulting mixture, stored in vessel 3, containing nitric acid, phosphoric acid, and calcium nitrate, is sent, by pump 4, into crystallizer 5, where the calcium nitrate is crystallized at a temperature of $-5°$ C, and then into the buffer vessel 6, which supplies the rotary filter 7. The calcium nitrate crystalls are retained on the filter, and the diluted acid solution, containing nitric acid and phosphoric acid, at the temperature of $-5°$ C, stored in vessel 8, is transferred by means of pump 9, to the neutralizing reactor 10, by introducing gaseous ammonia. The neutralized, diluted solution, containing the mixture of $NH_4NO_3$, $(NH_4)_3PO_4$ and small amounts of $Ca(NO_3)_2$, is pumped by pump 11, for concentration into the vacuum evaporator 12, whence it is sent to granulating, mixing with K salts and packaging.

The calcium nitrate, separated on filter 7, is passed on to decomposition with ammonium carbonate, into reactor 13. The resulting calcium carbonate suspension in ammonium nitrate, is filtered, on the rotary filter 14. The filtered 60% ammonium nitrate solution is stored in vessel 5 and then passed, by means of pump 16, for concentration, up to 99.8%, into vacuum evaporators, $17_1, 17_2, 17_3$, then to granulating, being used in forming the mixture of mixed fertilizers with N, P, K.

The waste condensates (water) resulting during the evaporation and concentration stages, in the evaporators 12, $17_1, 17_2$ and $17_3$, as well as the rinsing water of the residual gases, contain relatively large amounts of $NH_4NO_3$, $(NH_4)_3PO_4$, some $(NO_3)_2Ca$, etc., which fact gives rise to difficulties in their discharge, as waste water, into rivers, lakes, etc., without a previous purification.

To this end, according to the present invention, the said condensates, as well as those resulting in tower 17', destined for the absorption of gases with ammonia content, resulting at the neutralization phase in reactor 10, are collected in the buffer vessel 18, through pipes a, b, c, d, e, f and directed, by pump 19, to the demineralizing facility 20, similar, for instance, to that described in Example 1.

According to the invention, the condensates (waste water) are demineralized on ion exchangers, that are periodically regenerated in regenerating apparatuses fed with 60%, cold, nitric acid, through pipe g, and with ammonia solution, of 20 to 22%, through pipe h. The resulting mixed acid effluent is pumped, by pump 22 through pipe i, to the nitric attack phase in reactor 2, and the demineralized water is conducted, for use, through pipe j.

A more advantageous version constitutes the use, in regeneration, instead of the 60% nitric acid, of the solution resulting after the calcium nitrate filtering, from tank 8, through pipe k. The solution consists of a nitric acid and phosphoric acid mixture, at the temperature of $-5°$ C. The resulting effluent, with contents of ammonium nitrate, ammonium phosphate and free acids, is collected in tank 21 and conducted by pump 22, through pipe l and vessel 8, into the neutralizing reactor 10.

In both variants, there are used DUOLITE C264 as cationic resin and DUOLITE A366 as anionic resin, according to example 1, and the regeneration is carried out in the plant and at the parameters shown in said example. The two resins may be used in over 20,000 operating cycles.

The components purification and recovery from the waste water is integrally performed and at minimal expenses.

All percentages disclosed in the invention specification, either for the substances in the waste waters, or for those in the regenerants or effluents, are weight percentages; all volumes of treating regenerants and rinses of the ion exchange resins are measured as against the bulk volume of the resin (including the void spaces); further, all velocities referring to the treating regenerant and rinses circulated through the beds of the ion exchange resins, are bulk velocities, also measured as against the resin bulk volume, including the void spaces.

I claim:

1. A continuous process for treating and recovering an ion containing waste water from the manufacture of fertilizers with nitrogen and others, with ion exchange resins, by portions, comprising 1. ascendent flowing a stream of said waste water through a first fixing zone of a cation exchange unit, of a loop system, containing therein a compacted bed of strongly acidic cation exchange resin, of styrene-divinyl-benzene type, with high cross-linking degree, having 16–20% divinyl-benzene, sulphonated at 100° C, in beads, macroporous, whereby the stream of waste water with cations, flowing through said first zone of said cation exchange unit, contacts said cation exchange resin and exchanges the cations in the stream of waste water for the hydrogen ions of the cation exchange resin;
2. withdrawing a decationized waste water stream from said first zone of said cation exchange unit;
3. hydraulically passing said cation exchange resin, loaded with cations at step (1), into a second zone of said cation exchange unit, discharging the waste water and removing any non-discharged waste water remainder between the compacted beads of said exchange resin, with a flow of inert gas;
4. contacting the cation exchange resin, loaded with cations and with the transport waste water removed from its interstices at step (3), with a strongly concentrated nitric acid of 45 to 60%, by weight, used in great excess, as regenerant, to regenerate said cation exchange resin, under the conditions of maintaining the resin temperature at the interface of the regenerant acid/resin bead at a maximum of about 20° C, by suitably correlating the values of the regeneration parameters, i.e. the regenerant temperature of 0°–15° C, the regenerant volume of 10–30 times the resin bulk volume, the circulating bulk velocity of the regenerant of 10–50 m/h, and the thickness of the resin bed of a maximum of 0.600 m;
5. withdrawing an effluent strongly concentrated in nitric acid and with the eluated cation salts from the regeneration of said exchange resin, at step (4), from said cation exchange unit;
6. removing any remainder of said strongly concentrated effluent, from step (5), which has remained non-discharged in the interstices between the beads of said exchange resin, with a flow of inert gas;
7. rinsing the regenerated cation exchange resin from step (6) with cooled rinsing water;
8. hydraulically passing said cation exchange resin, rinsed at step (7), into a third loosening zone of said cation exchange unit, wherein fine resin particles, which have resulted in steps (1)–(7) are eliminated, in an ascendent water flow, said fine particles being eliminated by overflowing, drawn out by the loosening water;
9. hydraulically passing said cation exchange resin, loosened by water at step (8), into a fourth feeding zone of said cation exchange unit, wherein the transport water is then removed by overflowing, while the resin is compacted;
10. hydraulically passing said cation exchange resin, compacted at step (9), from the feeding zone, into the first cation fixing zone of said cation exchange unit, at step (1), and discharging therefrom the hydraulic transport water;
11. and repeating the same cycle of steps (1)-(10), in said cation exchange unit, as long as desired;
12. ascendent flowing the stream of waste water, decationized in step (1) and withdrawn in step (2), through a first fixing zone of an anion exchange unit, of a loop system, containing therein a compacted bed of middle basic anion exchange resin, of polyacrylic type, in beads, macroporous, whereby the stream of decationized waste water with anions, flowing through said first zone of said anion exchange unit, contacts said anion exchange resin and exchanges the anions in the stream of decationized waste water for the hydroxyl ions of an anion exchange resin;
13. withdrawing a stream of demineralized water from said first zone of said anion exchange unit;
14. hydraulically passing said anion exchange resin, loaded with anions at step (12), into a second zone of said anion exchange unit, discharging the demineralized water and removing any non-discharged dimineralized water remainder between the compacted beads of said anion exchange resin, with a flow of inert gas;
15. contacting the anion exchange resin, loaded with anions and with the water removed from its interstices at step (14), with strongly concentrated ammonia solution of 18 to 25%, by weight, used in small excess, as regenerant, to regenerate said anion exchange resin;
16. withdrawing an effluent, concentrated in the eluated anion salts, also containing the small ammonia excess, from the regeneration of said exchange resin at step (15), from said anion exchange unit;
17. removing any remainder of said effluent concentrated in eluated salts, from step (16), which has remained non-discharged in the interstices between the beads of said exchange resin, with a flow of inert gas;
18. rinsing the regenerated anion exchange resin from step (17) with rinsing water;
19. hydraulically passing said anion exchange resin, rinsed at step (18), into a third loosening zone of said anion exchange unit, wherein fine resin particles which have resulted in steps (12)–(19), are eliminated, in an ascendent water flow, said fine particles being eliminated by overflowing, drawn out by the loosening water;
20. hydraulically passing said anion exchange resin, loosened by water at step (19), into a fourth feeding zone of said anion exchange unit, wherein the transport water is removed then by overflowing, while the resin is compacted;
21. hydraulically passing said anion exchange resin, compacted at step (20), from the fourth feeding zone into the first anion fixing zone of said anion exchange unit, at step (12), and discharging therefrom the hydraulic transport water;
22. and repeating the same cycle of steps (12)–(21) in said anion exchange unit, as long as desired;
23. mixing said effluent strongly concentrated in nitric acid and with the eluated cation salts, from step (5), with said effluent concentrated in the eluated anion salts, from step (16), and directly introducing the resulting mixed effluent at a suitable stage in the manufacture process of fertilizers with nitrogen and others, wherein there are directly reclaimed both the excess acid and the contained salts; and 24. circulating the demineralized water flow, from step (13), through ion exchange resins, in a mixed bed, to remove any escaped cations and anions, and utilizing the effluent as highly demineralized water.

2. A continuous process for treating waste water containing ammonium nitrate and ammonia, from ammonium nitrate manufacture and producing granular ammonium nitrate and demineralized water comprising
1. ascendent flowing a stream of said waste water through a first fixing zone of a cation exchange unit, of a loop system, containing therein a compacted bed of strongly acidic cation exchange resin, of styrene-divinyl-benzene type, with high crosslinking degree, having 16–20% divinyl-benzene, sulphonated at 100° C, in beads, macroporous, whereby the stream of waste water with cations, flowing through said first zone of said cation exchange unit, contacts said cation exchange resin and exchanges the cations in the stream of waste water for the hydrogen ions of the cation exchange resin;
2. withdrawing a decationized waste water stream, from said first zone of said cation exchange unit;
3. hydraulically passing said cation exchange resin, loaded with cations at step (1), into a second zone of said cation exchange unit, discharging the waste water and removing any nondischarged waste water remainder between the compacted beads of said exchange resin, with a flow of inert gas;
4. contacting the cation exchange resin, loaded with cations and with the transport waste water removed from its interstices at step (3), with a strongly concentrated nitric acid of 45 to 60%, by weight, used in great excess, as regenerant, to regenerate said cation exchange resin, under the conditions of maintaining the resin temperature at the interface of the regenerant acid/resin bead at a maximum of about 20° C, by suitable correlating the values of the regeneration parameters, i.e. the regenerant temperature of 12°–15° C, the regenerant volume of about 12 times the resin bulk volume, the circulating bulk velocity of the regenerant of 15–18 m/h, and the thickness of the resin bed of a maximum of 0.600 m;
5. withdrawing an effluent strongly concentrated in nitric acid and with the eluated ammonium nitrate, from the regeneration of said exchange resin, at step (4), from said cation exchange unit;
6. removing any remainder of said strongly concentrated effluent, from step (5), which has remained non-discharged in the interstices between the beads of said exchange resin, with a flow of inert gas;
7. rinsing the regenerated cation exchange resin from step (6) with cooled rinsing water;
8. hydraulically passing said cation exchange resin, rinsed at step (7), into a third loosening zone of said cation exchange unit, wherein fine resin particles which have resulted in steps (1)–(7) are eliminated, in an ascendent water flow, said fine particles being eliminated by overflowing, drawn out by the loosening water;
9. hydraulically passing said cation exchange resin, loosened by water at step (8), into a fourth feeding zone of said cation exchange unit, wherein the transport water is then removed by overflowing, while the resin is compacted;
10. hydraulically passing said cation exchange resin, compacted at step (9), from the feeding zone, into the first cation fixing zone of said cation exchange unit, at step (1), and discharging therefrom the hydraulic transport water;
11. and repeating the same cycle of steps (1)–(10), in said cation exchange unit, as long as desired;
12. ascendent flowing the stream of waste water, decationized in step (1) and withdrawn in step (2), through a first fixing zone of an anion exchange unit, of a loop system, containing therein a compacted bed of middle basic anion exchange resin, of polyacrylic type, in beads, macroporous, whereby the stream of decationized waste water with anions, flowing through said first zone of said anion exchange unit, contacts said anion exchange resin and exchanges the anions in the stream of decationized waste water for the hydroxyl ions of the anion exchange resin;
13. withdrawing a stream of demineralized water from said first zone of said anion exchange unit;
14. hydraulically passing said anion exchange resin, loaded with anions at step (12), into a second zone of said anion exchange unit, discharging the demineralized water and removing any non-discharged demineralized water remainder between the compacted beads of said anion exchange resin, with a flow of nitrogen;
15. contacting the anion exchange resin, loaded with anions, and with the water removed from its interstices at step (14), with strongly concentrated ammonia solution of 18 to 22% by weight, used in small excess, as regenerant, to regenerate said anion exchange resin;
16. withdrawing an effluent, concentrated in the eluated ammonium nitrate, also containing the small ammonia excess, from the regeneration of said exchange resin, at step (15), from said anion exchange unit;
17. removing any remainder of said effluent concentrated in eluated salt, from step (16), which has remained non-discharged in the interstices between the beads of said exchange resin, with a flow of inert gas;
18. rinsing the regenerated anion exchange resin from step (17) with rinsing water;
19. hydraulically passing said anion exchange resin, rinsed at step (18), into a third loosening zone of said anion exchange unit, wherein fine resin particles which have resulted in steps (12)–(19) are eliminated. In an ascendent water flow, said fine particles being eliminated by overflowing, drawn out by the loosening water;
20. hydraulically passing said anion exchange resin, loosened by water at step (19), into a fourth feeding zone of said anion exchange unit, wherein the transport water is removed then by overflowing, while the resin is compacted;
21. hydraulically passing said anion exchange resin, compacted at step (20), from the fourth feeding zone into the first anion fixing zone of said anion exchange unit, at step (12), and discharging therefrom the hydraulic transport water;
22. and repeating the same cycle of steps (12)–(21), in said anion exchange unit, as long as desired;
23. mixing said effluent strongly concentrated in nitric acid and with the eluated concentrated ammonium nitrate, from step (5) with said effluent concentrated in eluated ammonium nitrate, from step (16), and recovering granular ammonium from the resulting mixed effluent, which contains 56 to 60% nitric acid and ammonium nitrate by neutralizing the nitric acid with gaseous ammonia; and 24. circulating the demineralized water flow, from step (13) through ion exchange resins, in a mixed bed, to remove any escaped cations and anions, and utilizing the effluent as highly demineralized water.

3. A continuous process for treating waste water containing ammonium nitrate, ammonia and triammonium phosphate and some calcium nitrate from the manufacture of complex fertilizers with N,P,K and in recovering granular crystalline material and demineralized water comprising 1. ascendent flowing a stream of waste water through a first fixing zone of a cation exchange unit, of a loop system, containing therein a compacted bed of strongly acidic cation exchange resin, of styrene-divinyl-benzene type, with high crosslinking degree, having 18–20% divinyl-benzene, sulphonated at 100° C, in beads, macroporous, whereby the stream of waste water with cations, flowing through said first zone of said cation exchange unit, contacts said cation exchange resin and exchanges the cations in the stream of waste water for the hydrogen ions of the cation exchange resin;

2. withdrawing a decationized waste water stream, from said first zone of said cation exchange unit;

3. hydraulically passing said cation exchange resin, loaded with cations at step (1), into a second zone of said cation exchange unit, discharging the waste water and removing any nondischarged waste water remainder between the compacted beads of said exchange resin, with a flow of nitrogen;

4. contacting the cation exchange resion, loaded with cations and with the transport waste water removed from its interstices at step (3), previously cooled at 18° C, with a strongly concentrated nitric acid of 60%, by weight, used in great excess, as regenerant, to regenerate said cation exchange resin, under the conditions of maintaining the resin temperature at the interface of the regenerant acid/resin bead at a maximum of about 20° C, by suitably correlating the values of the regeneration parameters, i.e. the regenerant temperature of 12°–15° C, the regenerant volume of about 12 times the resin bulk volume, the circulating bulk velocity of the regenerant of 15–18 m/h, and the thickness of the resin bed of a maximum of 0.600 m;

5. withdrawing an effluent strongly concentrated in nitric acid, concentrated in phosphoric acid and in the eluated cation salts, from the regeneration of said exchange resin, at step (4), from said cation exchange unit;

6. removing any remainder of said strongly concentrated effluent, from step (5), which has remained non-discharged in the interstices between the beads of said exchange resin, with a flow of nitrogen;

7. rinsing the regenerated cation exchange resin from step (6) with cooled rinsing water;

8. hydraulically passing said cation exchange resin, rinsed at step (7), into a third loosening zone of said cation exchange unit, wherein fine resin particles which have resulted in steps (1)–(7) are eliminated, in an ascendent water flow, said fine particles being eliminated by overflowing, drawn out by the loosening water;

9. hydraulically passing said cation exchange resin, loosened by water at step (8), into a fourth feeding zone of said cation exchange unit, wherein the transport water is then removed by overflowing, while the resin is compacted;

10. hydraulically passing said cation exchange resin, compacted at step (9), from the feeding zone, into the first cation fixing zone of said cation exchange unit, at step (1), and discharging therefrom the hydraulic transport water;

11. and repeating the same cycle of steps (1)–(10), in said cation exchange unit, as long as desired;

12. ascendent flowing the stream of waste water, decationized in step (1) and withdrawn in step (2), through a first fixing zone of an anion exchange unit, of a loop system, containing therein a compacted bed of middle basic anion exchange resin, of polyacrylic type, in beads, macroporous, whereby the stream of decationized waste water with anions, flowing through said first zone of said anion exchange unit, contacts said anion exchange resin and exchanges the anions in the stream of decationized waste water for the hydroxyl ions of the anion exchange resin;

13. withdrawing a stream of demineralized water from said first zone of said anion exchange unit;

14. hydraulically passing said anion exchange resin, loaded with anions at step (12), into a second zone of said anion exchange unit, discharging the demineralized water and removing any non-discharged demineralized water remainder between the compacted beads of said anion exchange resin, with a flow of inert gas;

15. contacting the anion exchange resin, loaded with anions and with the water removed from its interstices at step (14), with strongly concentrated ammonia solution of 18 to 22%, by weight, used in small excess, as regenerant, to regenerate said anion exchange resin;

16. withdrawing an effluent, concentrated in the eluated anion salts, also containing the small ammonia excess, from the regeneration of said exchange resin at step (15), from said anion exchange unit;

17. removing any remainder of said effluent concentrated in eluated salts, from step (16), which has remained non-discharged in the interstices between the beads of said exchange resin with a flow of inert gas;

18. rinsing the regenerated anion exchange resin from step (17) with rinsing water;

19. hydraulically passing said anion exchange resin, rinsed at step (18), into a third loosening zone of said anion exchange unit, wherein fine resin particles which have resulted in steps (12)–(19), are eliminated, in an ascendent water flow, said fine particles being eliminated by overflowing, drawn out by the loosening water;

20. hydraulically passing said anion exchange resin, loosened by water at step (19), into a fourth feeding zone of said anion exchange unit, wherein the transport water is then removed by overflowing, while the resin is compacted;

21. hydraulically passing said anion exchange resin, compacted at step (20), from the fourth feeding zone into the first anion fixing zone of said anion exchange unit, at step (12), and discharging therefrom the hydraulic transport water;
22. and repeating the same cycle of steps (12)–(21), in said anion exchange unit, as long as desired;
23. mixing said effluent strongly concentrated in acids and with the eluated cation salts from step (5), with said effluent concentrated in the eluated anion salts from step (16), and recovering from the resulting mixed effluent, which contains nitric acid of 56 to 60%, a granular crystalline product containing N, P and K and
24. circulating the emineralized water flow, from step (13), through ion exchange resins, in a mixed bed, to remove any escaped cations and anions, and utilizing the effluent as highly demineralized water.

4. In a process for treating waste water containing ammonium nitrate and triammonium phosphate and, some calcium nitrate from and in the manufacture of complex fertilizers with N, P, K, and producing a complex fertilizer by reacting phosphorites attack with nitric acid of 60%, under obtaining calcium nitrate in solution, separating by filtering from the strongly concentrated mixture, cooled at −5° C, of nitric acid, phosphoric acid and some calcium nitrate, whereby the acids are neutralized with gaseous ammonia, and the resulted salts solution is concentrated and then granulated, while the calcium nitrate in crystals is converted into a solution of ammonium nitrate, that is also concentrated and granulated, all granules being mixed and utilized in forming the complex fertilizers with N, P, K a process for treating said waste water with ion exchange resins, by portions, comprising 1. ascendent flowing a stream of waste water, through a first fixing zone of a cation exchange unit, of a loop system, containing therein a compacted bed of strongly acidic cation exchange resin of styrene-divinyl-benzene type, with high cross-linking degree, having 18–20% divinyl-benzene, sulphonated at 100° C, in beads, macroporous, whereby the stream of waste water with cations, flowing through said first zone of said cation exchange unit, contacts said cation exchange resin and exchanges the cations in the stream of waste water for the hydrogen ions of the cation exchange resin;
2. withdrawing a decationized waste water stream from said first zone of said cation exchange unit;
3. hydraulically passing said cation exchange resin loaded with cations at step (1), into a second zone of said cattion, exchange unit, discharging the waste water and removing any nondischarged waste water remainder between the compacted beads of said exchange resin with a flow of nitrogen;
4. contacting the cation exchange resin, loaded with cations, and with the transport waste water removed from its interstices at step (3), previously cooled at 18° C, with said mixture strongly concentrated, with nitric acid, phosphoric acid, some calcium nitrate a.o. readily cooled, used in great excess, as regenerant, to regenerate said cation exchange resin, under the conditions of maintaining the resin temperature at the interface of the regenerant acid/resin bead at a maximum of about 20° C, by suitably correlating the values of the regeneration parameters, i.e. the regenerant temperature of −5 to 0° C, the regenerant volume of about 12 times the resin bulk volume, the circulating bulk velocity of the regenerant of 15–18 m/h, and the thickness of the resin bed of a maximum of 0.600 m;
5. withdrawing an effluent strongly concentrated with nitric acid, phosphoric acid and the eluated cation salts, from the regeneration of said exchange resin, at step (4), from said cation exchange unit;
6. removing any remainder of said strongly concentrated effluent, from step (5), which has remained non-discharged in the interstices between the beads of said exchange resin, with a flow of nitrogen;
7. rinsing the regenerated cation exchange resin from step (6) with cooled rinsing water;
8. hydraulically passing said cation exchange resin, rinsed at step (7), into a third loosening zone of said cation exchange unit, wherein fine resin particles which have resulted in steps (1)–(7) are eliminated, in an ascendent water flow, said fine particles being eliminated by overflowing, drawn out by the loosening water;
9. hydraulically passing said cation exchange resin, loosened by water at step (8), into a fourth feeding zone of said cation exchange unit, wherein the transport water is then removed by overflowing, while the resin is compacted;
10. hydraulically passing said cation exchange resin, compacted at step (9), from the feeding zone, into the first cation fixing zone of said cation exchange unit, at step (1), and discharging therefrom the hydraulic transport water;
11. and repeating the same cycle of steps (1)–(10) in said cation exchange unit, as long as desired;
12. ascendent flowing the stream of waste water, decationized in step (1) and withdrawn in step (2), through a first fixing zone of an anion exchange unit, of a loop system, containing therein a compacted bed of middle basic anion exchange resin, of polyacrylic type, in beads, macroporous, whereby the stream of decationized waste water with anions, flowing through said first zone, of said anion exchange unit, contacts said anion exchange resin and exchanges the anions in the stream of decationized waste water for the hydroxyl ions of the anion exchange resin;
13. withdrawing a stream of demineralized water from said first zone of said anion exchange unit;
14. hydraulically passing said anion exchange resin, loaded with anions at step (12), into a second zone of said anion exchange unit, discharging the demineralized water and removing any non-discharged demineralized water remainder between the compacted beads of said anion exchange resin, with a flow of inert gas;
15. contacting the anion exchange resin, loaded with anions and with the water removed from its interstices, at step (14) with strongly concentrated ammonia solution of 18 to 22%, by weight, used in small excess, as regenerant, to regenerate said anion exchange resin;
16. withdrawing an effluent, concentrated in the eluated anion salts, also containing the small ammonia excess, from the regeneration of said exchange resin at step (15), from said anion exchange unit;

17. removing any remainder of said effluent concentrated in eluated salts, from step (16), which has remained non-discharged in the interstices between the beads of said exchange resin, with a flow of inert gas;
18. rinsing th regenerated anion exchange resin from step (17) with rinsing water;
19. hydraulically passing said anion exchange resin, rinsed at step (18), into a third loosening zone of said anion exchange unit, wherein fine resin particles which have resulted in steps (12)–(19) are eliminated, in an ascendent water flow, said fine particles being eliminated by overflowing, drawn out by the loosening water;
20. hydraulically passing said anion exchange resin, loosened by water at step (19), into a fourth feeding zone of said anion exchange unit, wherein the transport water is then removed by overflowing, while the resin is compacted;
21. hydraulically passing said anion exchange resin, compacted at step (20), from the fourth feeding zone into the first anion fixing zone of said anion exchange unit, at step (12), and discharging therefrom the hydraulic transport water;
22. and repeating the same cycle of steps (12)–(21) in said anion exchange unit, as long as desired;
23. mixing said effluent strongly concentrated in nitric acid and phosphoric acid and with the eluated cation salts, from step (5), with said effluent concentrated in the eluated anion salts, from step (16), and directly introducing the resulting mixed effluent, containing ammonium nitrate, tri-ammonium phosphate and calcium nitrate, as well as the excess of nitric acid and phosphoric acid in the manufacture process of said complex fertilizers with N, P, K at the said stage of neutralizing with gaseous ammonia; and
24. circulating the demineralized water flow, from step (13), through ion exchange resins, in a mixed bed, to remove any escaped cations and anions, and utilizing the effluent as highly demineralized water.

* * * * *